(12) United States Patent
Liu

(10) Patent No.: US 8,820,925 B2
(45) Date of Patent: *Sep. 2, 2014

(54) POLYMERIZABLE CONTACT LENS FORMULATIONS AND CONTACT LENSES OBTAINED THEREFROM

(75) Inventor: Yuwen Liu, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/192,535

(22) Filed: Jul. 28, 2011

(65) Prior Publication Data

US 2011/0281968 A1    Nov. 17, 2011

Related U.S. Application Data

(63) Continuation of application No. 12/352,904, filed on Jan. 13, 2009, now Pat. No. 8,011,784.

(60) Provisional application No. 61/020,843, filed on Jan. 14, 2008.

(51) Int. Cl.
   *G02C 7/04*     (2006.01)
   *G02B 1/04*     (2006.01)
   *C08F 30/02*    (2006.01)

(52) U.S. Cl.
   CPC ............... *C08F 30/02* (2013.01); *G02B 1/043* (2013.01)
   USPC .................. 351/159.33; 351/159.02; 523/106

(58) Field of Classification Search
   USPC ........................................................ 523/106
   See application file for complete search history.

(56) References Cited

U.S. PATENT DOCUMENTS 6,367,929 B1    4/2002    Maiden et al.
6,395,800 B1    5/2002    Jones et al.

(Continued)

FOREIGN PATENT DOCUMENTS

EP    1 955 842 A1    8/2008
EP    2 028 528 A1    2/2009

(Continued)

OTHER PUBLICATIONS

Andrews et al., "A comparison of the use of an ATP-based bioluminescent assay and image analysis for the assessment of bacterial adhesion to standard HEMA and biomimetic soft contact lenses," Biomaterials, vol. 22, No. 24, Dec. 15, 2001, pp. 3225-3233 (9 pages).

(Continued)

*Primary Examiner* — Peter F Godenschwager
*Assistant Examiner* — David Karst
(74) *Attorney, Agent, or Firm* — Kilyk & Bowersox, P.L.L.C.

(57) ABSTRACT

Contact lenses, such as hydrogel contact lenses, are described. The present contact lenses include a lens body that is the reaction product of a polymerizable composition. The polymerizable composition includes one or more monomers and a crosslinker that crosslinks the one or more monomers during polymerization. The polymerization of the one or more monomers occurs in the presence of a hydrophilic polymer that is present in the polymerizable composition, which comprises a polymer of 2-methacryloyloxyethyl phosphorylcholine. The present lenses are capable of releasing the hydrophilic polymer from the contact lens for prolonged periods of time and also have a reduced surface friction compared to similar lenses without the hydrophilic polymer. The present invention also relates to packaging systems for use with such lenses and methods of producing such lenses.

12 Claims, 6 Drawing Sheets

(56) References Cited

U.S. PATENT DOCUMENTS

| | | | |
|---|---|---|---|
| 6,420,453 | B1 | 7/2002 | Bowers et al. |
| 6,822,016 | B2 | 11/2004 | McCabe et al. |
| 7,279,507 | B2 | 10/2007 | Hu et al. |
| 2001/0044482 | A1* | 11/2001 | Hu et al. ............... 523/106 |
| 2003/0162862 | A1 | 8/2003 | McCabe et al. |
| 2003/0186825 | A1 | 10/2003 | Mitani et al. |
| 2004/0214914 | A1 | 10/2004 | Marmo |
| 2005/0148682 | A1* | 7/2005 | Hu et al. ............... 523/106 |
| 2006/0217276 | A1* | 9/2006 | Mitani et al. ........... 510/112 |
| 2007/0010595 | A1 | 1/2007 | McCabe et al. |
| 2007/0222094 | A1 | 9/2007 | Alli et al. |
| 2008/0269370 | A1* | 10/2008 | Myung et al. .......... 523/105 |
| 2008/0317818 | A1* | 12/2008 | Griffith et al. ......... 424/427 |
| 2009/0100801 | A1 | 4/2009 | Zhao et al. |
| 2009/0182068 | A1 | 7/2009 | Liu |
| 2010/0040870 | A1* | 2/2010 | Alm et al. .............. 428/334 |

FOREIGN PATENT DOCUMENTS

| | | |
|---|---|---|
| JP | 2002-030117 | 1/2002 |
| JP | 2006-198001 | 8/2006 |
| WO | WO 2009/089206 A2 | 7/2009 |

OTHER PUBLICATIONS

Goda et al., "Water structure and improved mechanical properties of phospholipid polymer hydrogel with phosphorylcholine centered intermolecular cross-linker," Polymer, vol. 47, No. 4, Feb. 8, 2006, pp. 1390-1396 (7 pages).

Kiritoshi et al., "Synthesis of hydrophilic cross-linker having phosphorylcholine-like linkage for improvement of hydrogel properties," Polymer, vol. 45, No. 22, Oct. 13, 2004, pp. 7499-7504 (6 pages).

Goda et al., "Soft contact lens biomaterials from bioinspired phospholipid polymers," Expert Review of Medical Devices, vol. 3, No. 2, Mar. 1, 2006, pp. 167-174 (8 pages).

International Search Report and Written Opinion of the International Searching Authority for corresponding International Patent Application No. PCT/US2009/030840 dated Sep. 14, 2009 (17 pages).

International Search Report and Written Opinion of the International Searching Authority for related International Patent Application No. PCT/US2009/030846 dated Sep. 11, 2009 (14 pages).

Japanese Office Action dated May 15, 2013 issued in corresponding Japanese Patent Application No. 2010-543188 (4 pages).

* cited by examiner

POLYMERIZABLE CONTACT LENS FORMULATIONS AND CONTACT LENSES OBTAINED THEREFROM

CROSS-REFERENCE TO RELATED APPLICATIONS

This application is a continuation of U.S. patent application No. 12/352,904, filed Jan. 13, 2009, now allowed, which in turn claims the benefit of U.S. Patent Application No. 61/020,843, filed Jan. 14, 2008, the entire contents of which are hereby incorporated by reference.

FIELD OF THE INVENTION

The present invention relates to compositions useful for making contact lenses, such contact lenses, packaging systems including same, and methods of producing same. More particularly, the invention relates to contact lens-forming polymerizable compositions containing one or more polymers comprising units of 2-methacryloyloxyethyl phosphorylcholine, hydrogel contact lenses formed from the polymerizable compositions, contact lens packaging systems for use with the lenses, and methods of producing the lenses.

BACKGROUND

Hydrophilic contact lenses can be formed from cross-linked polymers based on hydrophilic derivatives of acrylic or methacrylic acid, hydrophilic vinylic monomers such as vinylpyrrolidone, and the like. When hydrated, these hydrophilic cross-linked polymers can be referred to as hydrogels and include relatively large quantities of water without dissolving. Such polymers may include polymeric units derived from less hydrophilic, or even hydrophobic, monomers to confer mechanical strength and other useful properties.

End of the day discomfort is a condition reported by many hydrogel contact lens wearers. Discomfort associated with hydrogel contact lenses may be related to changes in water content or dehydration, changes in lubricity of a surface of the contact lens, or lens design, among other factors.

SUMMARY

New contact lenses, such as hydrogel contact lenses, polymerizable compositions useful for making such lenses, packaging systems for use with such lenses and methods of producing such lenses, have been discovered. The present contact lenses have relatively low surface friction and are able to release hydrophilic polymers present in the contact lenses for prolonged periods of time.

The present contact lenses comprise a lens body. The lens body is the reaction product of a polymerizable composition comprising one or more monomers, and a crosslinker that crosslinks the monomers during a polymerization reaction to form a first polymer component. The polymerizable composition also comprises a hydrophilic polymer component, which is substantially unreactive during the polymerization. The resulting lens body thus includes a first polymer component formed from the one or more monomers present in the polymerizable composition, and the second polymer component, the hydrophilic polmer component that is physically entangled with the first polymer component in the lens body. In an embodiment, the hydrophilic polymer component comprises one or more polymers comprising units of 2-methacryloyloxyethyl phosphorylcholine (MPC).

In some embodiments, the hydrophilic polymer component included in the polymerizable composition which becomes the second hydrophilic polymer in the lens body comprises a polymer of 2-methacryloyloxyethyl phosphorylcholine (MPC). In some embodiments, the polymer of MPC comprises at least one polymer of MPC. Examples of polymers of MPC include, but are not limited to, homopolymers of 2-methacryloyloxyethyl phosphorylcholine (PMPC) and copolymers of MPC. Examples of copolymers of MPC include, but are not limited to, copolymers of 2-methacryloyloxyethyl phosphorylcholine and n-butylmethacrylate (MPC/PMB), copolymers of 2-methacryloyloxyethyl phosphorylcholine and methacryloyloxyethyl ethylene oxide and methacryloyloxyethyl propylene oxide (MPC/PMEP), and combinations thereof. In one embodiment, the polymer of MPC comprises a homopolymer of 2-methacryloyloxyethyl phosphorylcholine (PMPC), a copolymer of MPC, and combinations thereof. In one embodiment, the hydrophilic polymer component comprises a copolymer of 2-methacryloyloxyethyl phosphorylcholine and n-butylmethacrylate (MPC/PMB).

In other embodiments, the hydrophilic polymer component further comprises a polymer of N-vinyl pyrrolidone (PVP) as an additional hydrophilic polymer component. In one such embodiment, the hydrophilic composition comprises a copolymer of 2-methacryloyloxyethyl phosphorylcholine and n-butylmethacrylate (MPC/PMB) and a polymer of N-vinyl pyrrolidone (PVP).

The lens bodies in accordance with the present invention can exhibit one or more of the following beneficial characteristics and properties. In embodiments, the polymer of MPC is associated with the lens body such that it is released from the contact lens over at least about eight hours, or at least about 16 hours, based on in vitro release testing. In other embodiments, the surface friction of the lens body is at least about 10% less, or at least about 20% less, or at least about 30% less, or at least about 35% less than a surface friction of a second contact lens comprising the reaction product of an identical polymerizable composition without the polymer of 2-methacryloyloxyethyl phosphorylcholine. In one embodiment, the polymer of MPC is a copolymer of 2-methacryloyloxyethyl phosphorylcholine and n-butylmethacrylate (MPC/PMB). In other embodiments, the sessile drop contact angle of the lens body is at least about 5% less, or at least about 15% less, or at least about 30% less than the second contact lens as described above. The sessile drop contact angle is an in vitro measure of contact lens surface wettability, where a lower contact angle is indicative of a more wettable lens surface compared to a greater contact angle.

In another aspect, packaging systems are provided which comprise a lens body and a packaging solution. The lens body is the reaction product of a polymerizable composition, the polymerizable composition comprising one or more monomers, at least one crosslinker that crosslinks the one or more monomers during polymerization, and a hydrophilic polymer component comprising a polymer of MPC. The packaging solution comprises an aqueous solution containing a second hydrophilic polymer component comprising at least one polymer of MPC and/or at least one form of polyvinyl pyrrolidone (PVP). A container also can be provided for holding the contact lens and the packaging solution.

In yet another aspect, methods for producing contact lenses are provided. Such methods comprise providing a polymerizable composition comprising one or more monomers, at least one crosslinker, and hydrophilic polymer component comprising a polymer of MPC, and polymerizing the polymerizable composition, to provide a lens body. In embodiments, the polymer of MPC is associated with the lens body made by the method such that the polymer is released from the lens body over at least eight hours based on in vitro release testing. The polymerizing step can occur in a contact lens mold. The contact lens body can be placed in a packaging system, such as packaging system as described elsewhere herein.

Additional aspects and details of the present invention are also described by the following detailed description, examples, drawings, and appended claims.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

DETAILED DESCRIPTION

Figure 1:
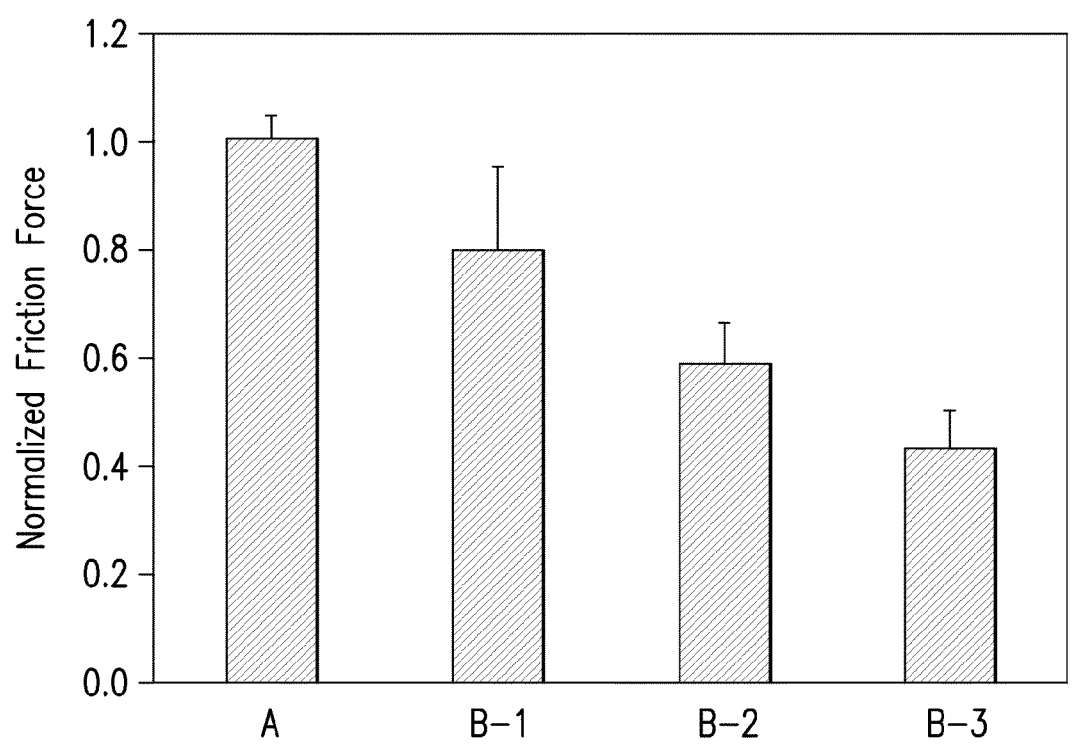
FIG. 1 is a graph illustrating a reduction in surface friction force of contact lenses that are the reaction product of polymerizable contact lens formulation containing monomers, a crosslinker reactive with the monomers, and a substantially unreactive hydrophilic polymer comprising a polymer of MPC.

Unique contact lens formulations and contact lenses are provided. The present contact lenses have relatively low surface friction and are able to release hydrophilic polymers present in the contact lenses for prolonged periods of time. The present contact lenses are soft contact lenses that are able to absorb and retain water in an equilibrium state. Thus, the present contact lenses can be understood to be hydrogel contact lenses.

As used herein, a polymer refers to a compound with a molecular weight of at least 1,000 daltons that is formed of linked monomeric units, and includes homopolymers, copolymers, terpolymers, and the like, as understood by persons of ordinary skill in the art. As understood in the art, a copolymer refers to a polymer formed of two or more different monomeric units.

As used herein, the term "hydrogel" refers to a network or matrix of polymer chains, some or all of which may be water-soluble, and which may contain high percentages of water. Hydrogels refer to polymeric materials, including contact lenses, that are water swellable or water swelled. Thus, a hydrogel may be unhydrated and be water swellable, or a hydrogel may be partially hydrated and swollen with water, or a hydrogel may be fully hydrated and swollen with water.

In one aspect of the present invention, contact lenses are provided comprising a lens body suitable for placement on an eye of a contact lens wearer. The lens body has an anterior surface and a posterior surface which is oriented toward the corneal epithelium of the eye when the lens is worn by the lens wearer. The lens body of the present contact lenses is the reaction product or polymerized product of a polymerizable composition or formulation.

In certain embodiments of the present contact lenses, the polymerizable composition, from which the lens body is formed, comprises one or more monomers and a crosslinker that crosslinks the one or more monomers during polymerization to form a first polymer component. The polymerizable composition also comprises a hydrophilic polymer component. The polymerization takes place or occurs in the presence of the hydrophilic polymer component. The hydrophilic polymer component is associated with the first polymer component in the lens body such that the hydrophilic polymer component is released from the lens body over prolonged periods of time. The hydrophilic component can be released over time periods such as, for example, for at least about eight (8) hours, or at least about sixteen (16) hours, based on in vitro release testing.

The hydrophilic polymer component is unreactive or substantially unreactive during the polymerization process. Thus, the resulting hydrogel lens body can be understood to comprise a network of a first polymeric component, formed from the monomers present in the polymerizable composition, and a second polymeric component, the hydrophilic polymer component, in which the hydrophilic polymer component is substantially physically entrapped by the first polymer component. Although there may be some small amounts of reactivity of the hydrophilic polymer component, the reactivity is not sufficient to prevent leaching or release of the hydrophilic polymer from the lens body. The present contact lenses can be understood to comprise an interpenetrating polymer network (IPN) where the formation of the first polymer component occurs in the presence of the hydrophilic polymer component. However, as discussed herein, in the present contact lenses, it is possible for the hydrophilic polymer component to be released from the lens body even though it is entrapped by the first polymer component.

The polymerizable composition may also comprise other agents and additives. For example, the polymerizable composition may comprise a polymerization initiator. The polymerization initiator may be a thermal initiator, an ultraviolet initiator, or other initiator. In addition or alternatively, the polymerizable composition may also comprise a tinting agent, an ultraviolet absorbing agent, a colorant, an antimicrobial agent, and the like and mixtures thereof.

In certain embodiments of the present lenses, the polymerizable composition comprises a plurality of monomers, and the first polymer component is a polymer of the plurality of monomers. The hydrophilic polymer component is sufficiently unreactive to prevent copolymerization of the hydrophilic polymer component with the monomers that polymerize to form the first polymer component.

In some of the polymerizable compositions, the hydrophilic polymer component can comprise at least two hydrophilic polymer components to provide a combination of hydrophilic polymers physically entrapped in the hydrogel lens body. In one embodiment, the at least two hydrophilic polymer components comprise at least two polymers of MPC. In another embodiment, the at least two hydrophilic polymer components comprise at least one polymer of MPC and a form of polyvinyl pyrrolidone (PVP). In at least one embodiment, the at least two hydrophilic polymer components each have a different molecular weight. By including hydrophilic polymer components of different molecular weights in the polymerizable composition, it is possible to provide different release profiles of the hydrophilic polymer components from the lens body compared to contact lenses that include only one hydrophilic polymer component in the polymerizable lens composition.

In various embodiments, the monomers that can be used in preparing the first polymer component of the polymerized formulation can contain at least one hydrophilic monomeric component including, but not limited to, 2-hydroxyethyl methacrylate (HEMA), 2-(3-phenyl-3-methylcyclobutyl)-2-hydroxyethyl methacrylate (PC-HEMA), 2-hydroxyethyl acrylate, 2-hydroxypropyl methacrylate, 2-hydroxypropyl methacrylate, 2-hydroxypropyl acrylate, 3-hydroxypropyl methacrylate, glycerol mono-acrylate, glycerol mono-methacrylate, n-vinylpyrrolidone, acrylamide, and the like and mixtures thereof. In a preferred embodiment, a major proportion (i.e., >50% by weight) of the first polymer component is derived from one or more of the above-indicated monomeric component(s), such as HEMA alone or in combination with one or more other such monomers. In various embodiments, the at least one hydrophilic monomeric component, such as HEMA alone or in combination with one or more other reactive hydrophilic monomers, can be included, for example, in total amounts of about 50 wt % to about 97 wt %, or about 65 wt % to about 90 wt %, or about 70 wt % to about 85 wt %, by weight of the polymerizable composition. As indicated, the polymerizable composition includes the reactive monomer mixture used to prepare the first polymer component, and the hydrophilic polymer component which becomes the second hydrophilic polymer component upon polymerization of the polymerizable composition. Other amounts of the HEMA and/or other hydrophilic monomers also may be used. The reactive monomer component also can contain at least one polymerizable phospholipid monomer, such as 2-methacryloyloxyethyl phosphorylcholine (MPC). The phospholipid monomer can be included, for example, in amounts of up to about 20 wt %, or about 1 wt % to about 15 wt %, or about 10 wt % to about 20 wt %, by weight of the polymerizable composition. Other amounts of the phospholipid monomer also may be used. Optionally, and although not required in the present contact lenses, small amounts of other monomers (e.g., about 1 to about 5 wt %), such as methacrylic acid, can be included, which can be used to influence the amount of water that the hydrophilic polymeric material absorbs at equilibrium.

A cross-linking monomeric component preferably is also included in the reactive monomer mixture used for preparing the first polymer component. Examples of useful cross-linking monomeric component agents or components include, but are not limited to, ethylene glycol dimethacrylate (EGDMA), trimethylolpropane trimethacrylate (TMPTMA), glycerol trimethacrylate, polyethylene glycol dimethacrylate (wherein the polyethylene glycol has a molecular weight up to, for example, about 5000), other polyacrylate and polymethacrylate esters, end-capped polyoxyethylene polyols containing two or more terminal methacrylate moieties, and the like and mixtures thereof. The cross-linking monomer is used in an amount effective to produce a desired degree of crosslinking of the first polymer component. The cross-linking monomer can be used in an amount, e.g., from about 0.05 wt % to about 5.0 wt %, or about 0.1 wt % to about 2.0 wt %, or about 0.5 wt % to about 3.0 wt %, by weight of the polymerizable composition. Other amounts of the cross-linking monomer also may be used.

As indicated, polymerization initiators can be used in the polymerizable composition. Thermal initiators that may be used include, but are not limited to, azo or peroxide compounds, such as those having a half-life at the polymerization temperature of at least 20 minutes. Useful azo compounds include, but are not limited to, 2,2'-azo-bis-isobutyro-nitrile, 2,2'-azo-bis(2,4-dimethylvaleronitrile), 1,1'-azo-bis(cyclohexane carbonitrile), 2,2'azo-bis(2,4-dimethyl-4-methoxy-valeronitrile) and the like and mixtures thereof. Useful peroxy compounds include, but are not limited to, isopropyl percarbonate, tert-butyl peroctoate, benzoyl peroxide, lauroyl peroxide, decanoyl peroxide, acetyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis(2-ethylhexanoyl-peroxy)hexane, p-chlorobenzoyl peroxide, tert-butyl peroxybutyrate, tert-butyl peroxymaleic acid, tert-butylperoxyisopropyl carbonate, bis(1-hydroxycyclohexyl)peroxide and the like and mixtures thereof. In embodiments wherein the hydrophilic polymer of the polymerizable composition comprises at least one form of PVP, the use of peroxide compounds as initiators is to be avoided, as these compounds can react with PVP. Redox initiators also may be used, which include, but are not limited to, ammonium persulfate-sodium thiosulfate, potassium sulfate-Mohr's salt, and one or more peroxides with reducing agents such as sodium thiosulfate. UV (ultraviolet light)-activated initiators include, but are not limited to, photoinitiators such as diethoxyacetophenone, 1-hydroxycyclohexyl phenyl ketone, 2,2-dimethoxy-2-phenylacetophenone, phenothiazine, diisopropylxanthogen disulfide, benzoin, benzoin methyl ether, other benzoin derivatives, 2,2'-azo-bis-isobutyro-nitrile and the like and mixtures thereof. Other free radical generating mechanisms can be employed, such as X-rays, electron-beams, and the like. An effective amount of the initiator used can vary depending on factors such as the type of initiator, the reactive monomer composition, and so forth. In general, the amount of initiator used may be, for example, up to about 2 wt %, or about 0.005 wt % to about 1 wt %, or about 0.1 to about 0.75 wt %, by weight of the polymerizable composition.

Tinting agents, if used, can be any agent that imparts a visibility to the otherwise clear hydrogel lens body. The tinting agent may be a water soluble dye, or particles of pigment, or combinations thereof. Some examples of tinting agents include copper phthalocyanine blue, Vat Blue 6, Reactive Blue 4, Reactive blue 19 and the like. An effective amount of the tinting agent used can vary depending on factors such as the type of tinting agent, the reactive monomer composition, the non-reactive polymers present, and so forth. In general, the amount of tinting agent used may be, for example, up to about 15 wt %, or about 0.005 wt % to about 2 wt %, or about 1 wt % to about 10 wt %, or about 3 wt % to about 8 wt %, by weight of the polymerizable composition.

Some of the present polymerizable compositions, including those that contain PVP, may include water in addition to the other components. The amount of water can be up to about 10 wt %, or about 0 to about 7 wt %, or about 0 to about 5 wt %, by weight of the polymerizable composition.

In certain embodiments of the present contact lenses, including those described in the examples herein, the polymerizable composition comprises, in addition to the hydrophilic polymer component, 2-hydroxyethyl methacrylate (HEMA), 2-methacryloyloxyethyl phosphorylcholine (MPC), an ethyleneglycol dimethacrylate crosslinker, a polymerization initiator, and optionally a VAT Blue 6 tinting agent.

In various embodiments of the present contact lenses, the hydrophilic polymer component is at least one polymer of 2-methacryloyloxyethyl phosphorylcholine. The hydrophilic polymer can be selected, for example, from a homopolymer of 2-methacryloyloxyethyl phosphorylcholine (PMPC), a copolymer of 2-methacryloyloxyethyl phosphorylcholine and n-butylmethacrylate (MPC/BMA), a copolymer of 2-methacryloyloxyethyl phosphorylcholine and methacryloyloxyethyl ethylene oxide and methacryloyloxyethyl propylene oxide (MPC/PMEP) and the like and mixtures thereof. In some embodiments, the hydrophilic polymer can comprise one or more polymers of MPC, and an additional hydrophilic component such as a form of polyethylene glycol (PEG), a form of polyvinyl pyrrolidone (PVP) and the like and mixtures thereof. In an embodiment, the hydrophilic polymer component is a copolymer of 2-methacryloyloxyethyl phosphorylcholine and n-butylmethacrylate (MPC/BMA) which is represented by Formula I below:

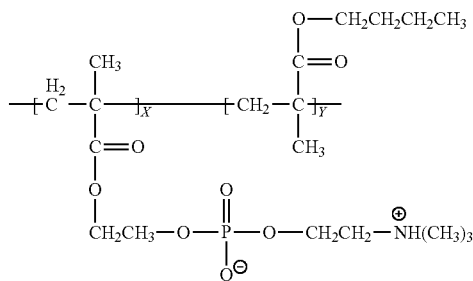

where X is about 1,600 to about 2,400 and Y is about 400 to about 600, or X is about 1,800 to about 2,200 and Y is about 450 to about 550, or X is about 1,900 to about 2,100 and Y is about 475 to about 525.

A copolymer of 2-methacryloyloxyethyl phosphorylcholine and n-butylmethacrylate (MPC/BMA) is commercially available under the tradename of LIPIDURE-PMB® (NOF Corporation, Japan). LIPIDURE-PMB® also is abbreviated herein as "Lipidure" and "LIP." LIP is represented by Formula I described herein where X is about 2000 and Y is about 500. As indicated, other values for X and Y may be used.

In other aspects, the hydrophilic polymer component further comprises at least one form of polyvinyl pyrrolidone (PVP). PVP can be used in combination with a homopolymer of MPC, at least one copolymer of MPC, and combinations thereof. In one embodiment, the PVP is used in combination with 2-methacryloyloxyethyl phosphorylcholine and n-butylmethacrylate (MPC/BMA).

Polyvinyl pyrrolidone (PVP) is a water-soluble polymer made from the monomer N-vinylpyrrolidone. PVP can be represented by the formula:

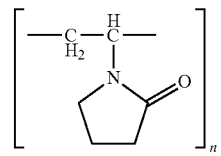

wherein the coefficient "n" has a positive value of least 2 or greater.

The molecular weights of PVP are designated herein by (kilo)daltons or by "K-value." The K-value is Fikentscher's value of viscosity characteristics which represents a viscosity index relating to molecular weight. The K-value is calculated by the following formula:

$$K = \frac{(1.5 \log \eta - 1)/(0.15 + 0.003c) + (300 c \log \eta + (c + 1.5 c \log \eta)^2)^{1/2}}{(0.15c + 0.003c^2)}$$

where $\eta$ is the relative viscosity of aqueous PVP solution to water and c is the weight percent of PVP in aqueous solution.

The PVP can have a molecular weight, either a number average molecular weight or a weight average molecular weight, of at least 10,000 daltons. Typically, the PVP has a molecular weight between 10,000 daltons and 1,500,000 million daltons. In certain embodiments, the PVP has a number average molecular weight or a weight average molecular weight of at least 300,000 daltons. In one aspect, when combinations of PVP are included in the polymerizable compositions, at least one form of PVP with a relatively wide range of polydispersity or non-uniformity in molecular weight can be included. With wider molecular weight ranges, it is possible to provide contact lenses with in vitro release profiles that demonstrate that a form of PVP can be released from the lens body over time.

In other aspects, the hydrophilic polymer of the polymerizable composition can further comprise at least two forms of polyvinyl pyrrolidone, each of the at least two forms of polyvinyl pyrrolidone having a different average molecular weight. For example, the polyvinyl pyrrolidone can comprise a mixture of about 20% to about 40% by weight of a polyvinyl pyrrolidone having a K-value of about 10 to about 50 based on Fikentscher's value of viscosity characteristics equation, and about 60% to about 80% by weight of a polyvinyl pyrrolidone having a K value of about 80 to about 120. The mixture also may comprise about 30% by weight of a polyvinyl pyrrolidone having a K-value of about 30 based on Fikentscher's value of viscosity characteristics equation, and about 70% by weight of a polyvinyl pyrrolidone having a K value of about 90.

In embodiments of the present contact lenses, the hydrophilic polymer component is present in the polymerizable composition in an amount from about 0.005 wt % to about 20 wt %, or about 1 wt % to about 10 wt %, or about 3 wt % to about 15 wt %, by weight of the polymerizable composition. These amounts are based on the total amount of the hydrophilic polymer component(s) present in the polymerizable composition. The polymer of MPC, such as LIP, can be present in the polymerizable composition in an amount of up to about 15 wt %, or about 0.005 wt % to about 10 wt %, or about 0.01 wt % to about 5 wt %, or about 1 wt % to about 6 wt %, or about 1 wt % to about 3 wt %, by weight of the polymerizable composition. PVP can be present in the polymerizable composition in an amount of up to about 20 wt %, or about 0.005 wt % to about 10 wt %, or about 0.01 wt % to about 5 wt %, or about 1 wt % to about 6 wt %, or about 1 wt % to about 3 wt %, by weight of the polymerizable composition. Other amounts of the hydrophilic polymer component(s) also may be used.

In addition to the prolonged release of the hydrophilic polymer, the lens bodies of embodiments of the present contact lenses have a reduced surface friction compared to a second contact lens comprising the reaction product of an identical polymerizable composition without the hydrophilic polymer component. In certain embodiments of the present contact lenses, including about 5 wt % by weight of the hydrophilic polymer component in the polymerizable composition results in lens bodies in which the surface friction of the lens body is reduced by at least about 50% compared to a second contact lens comprising the reaction product of an identical polymerizable composition made without the hydrophilic polymer component.

The lens bodies of the present contact lenses also have ophthalmically compatible surface wettabilities. The wettability of a contact lens can be evaluated in vitro by measuring the contact angle of a lens surface. Using the sessile drop contact angle measurement technique, which is conventionally known by persons of ordinary skill in the art, embodiments of the present contact lenses had a lens body that had a sessile drop contact angle that is reduced by at least about 30% compared to the second contact lens, as described above.

In view of the disclosure herein, it can be appreciated that at least one embodiment of the present contact lenses comprises a lens body which is the reaction product of a polymerizable composition, wherein the polymerizable composition comprises one or more monomers, a crosslinker that crosslinks the one or more monomers during polymerization, and a polymer of 2-MPC, such as LIP, as shown in Formula I above.

In certain of these contact lenses containing LIP, the polymerizable composition also comprises 2-hydroxyethyl methacrylate (HEMA), 2-methacryloyloxyethyl phosphorylcholine (MPC), an ethyleneglycol dimethacrylate crosslinker, a thermal polymerization initiator, a VAT Blue 6 tinting agent. In certain embodiments of these contact lenses, the thermal polymerization initiator may be 2,2'-azobisisobutyronitrile (AIBN). In addition, in certain embodiments, the HEMA and MPC (if present) are contained in the composition in a combined amount from about 80% (wt/wt) to about 90% (wt/wt). The LIP may be present in the composition in an amount from about 1% (wt/wt) to about 6% (wt/wt), in certain embodiments.

The lens bodies of the LIP containing contact lenses can have a reduced surface friction relative to a second contact lens comprising the reaction product of an identical polymerizable composition without the LIP. In at least one embodiment, where the polymerizable composition of these contact lenses contains about 5 wt % by weight of LIP, the lens bodies that are the reaction product of such compositions have a surface friction that is reduced by at least about 40% relative to a second contact lens comprising the reaction product of an identical polymerizable composition without the LIP.

The polymer of MPC, such as LIP, can be present in the lens body such that the polymer is released from the lens body during in vitro testing for at least about eight hours, or for at least about sixteen hours.

In embodiments, the surface friction of the lens body is at least 10% less, or at least about 20% less, or least about 30% less, or at least 35% less than a surface friction of a second contact lens comprising the reaction product of an identical polymerizable composition without the at least one polymer of MPC.

In addition, in certain embodiments, the lens body of the contact lenses containing a form of polyvinyl pyrrolidone in addition to the polymer of MPC, such as LIP, has a sessile drop contact angle that is at least about 5% less, or least about 15% less, or at least about 30% less than the sessile drop contact angle of a second contact lens comprising the reaction product of an identical polymerizable composition without the copolymer.

As indicated, the polymerizable composition used in making the contact lenses containing a polymer of MPC can further comprise at least one form of polyvinyl pyrrolidone as an additional hydrophilic polymer component. In certain embodiments, the polymerizable composition can include at least two forms of polyvinylpyrrolidone, wherein at least two forms of polyvinylpyrrolidone have a different average molecular weight relative to each other, such as illustrated elsewhere herein, in combination with a copolymer of MPC, such as LIP.

Additional embodiments of the present contact lenses comprise a lens body which is the reaction product of a polymerizable composition, wherein the polymerizable composition comprises 2-hydroxyethyl methacrylate (HEMA), 2-methacryloyloxyethyl phosphorylcholine (MPC), an ethyleneglycol dimethacrylate crosslinker, a thermal water soluble polymerization initiator, a VAT Blue 6 tinting agent, water, a copolymer of 2-methacryloyloxyethyl phosphorylcholine and n-butylmethacrylate (MPC/BMA) such as LIP, and polyvinyl pyrrolidone. In certain embodiments of these contact lenses, the thermal water soluble polymerization initiator is ammonium persulphate or 2,2'-azo-bis-isobutyrylnitrile (AIBN). In addition, in certain embodiments, the HEMA and MPC (if present) are contained in the composition in a combined amount from about 80% (wt/wt) to about 90% (wt/wt). The polyvinyl pyrrolidone is present in the composition in an amount from about 1% (wt/wt) to about 6% (wt/wt), in certain embodiments. The LIP is present in the composition in an amount from about 0.005 wt % to 7%, in certain embodiments As discussed herein, the polyvinyl pyrrolidone can be present in the lens body such that the polyvinyl pyrrolidone is released from the lens body during in vitro testing for at least about eight hours, or at least about sixteen hours. The polyvinyl pyrrolidone typically has a number average molecular weight or a weight average molecular weight of at least 10,000 daltons and less than 1,500,000 daltons. In addition, in certain embodiments, the lens body of these PVP-containing contact lenses has a sessile drop contact angle that is at least about 5% less, or at least about 15% less, or at least about 30% less than the sessile drop contact angle of a second contact lens comprising the reaction product of an identical polymerizable composition without the polyvinyl pyrrolidone. In these contact lenses with polyvinyl pyrrolidone, embodiments of the lenses comprise a lens body that has a surface friction that is at least 10% less, or at least about 20% less, or least about 30%, or at least about 35% less than the surface friction of a second contact lens comprising the reaction product of an identical polymerizable composition without the polyvinyl pyrrolidone.

Methods also are provided for producing a lens body with the polymerizable composition comprising providing a polymerizable composition comprising one or more monomers, at least one crosslinker, and at least one copolymer of 2-methacryloyloxyethyl phosphorylcholine, and polymerizing the polymerizable composition, to provide a lens body. In embodiments, polyvinyl pyrrolidone also can be included with the copolymer of 2-methacryloyloxyethyl phosphorylcholine in the polymerizable composition.

The present contact lenses can be lathed contact lenses, spincast contact lenses, or cast molded contact lenses. It can be appreciated that these types of contact lenses can have different physical features resulting from their method of manufacture. In certain embodiments, including the embodiments of the examples, each of the contact lenses is a cast molded contact lens. In other words, it is a contact lens obtained from a contact lens mold assembly formed from two contact lens mold members (e.g. male and female contact lens mold members) in contact with each other to form a contact lens shaped cavity.

In certain embodiments, the present contact lenses are daily disposable contact lenses (i.e., a contact lens that is worn on a person's eye only once and then discarded). Other embodiments of the present contact lenses are daily wear lenses (i.e., a lens that is worn on a person's eye, and is then cleaned and is worn on the person's eye for at least one additional time). It can be appreciated that daily disposable contact lenses are physically different, chemically different, or both compared to daily wear contact lenses. For example, formulations used to make daily wear contact lenses are different than formulations used to make daily disposable contact lenses due to the economic and commercial factors in making substantially larger volumes of daily disposable contact lenses.

The lens bodies of the present contact lenses can have spherical surfaces, aspherical surfaces, toric surfaces, or combinations thereof. The present contact lenses can be understood to be monofocal contact lenses, multifocal contact lenses, including bifocal contact lenses, toric contact lenses, or combinations thereof.

The present contact lenses can be provided in packages. The contact lens packaging systems can include the lens body in a packaging solution containing one or more wetting agents or surfactants. In embodiments, the packaging solution can comprise an aqueous solution containing at least one polymer of 2-methacryloyloxyethyl phosphorylcholine that may be the same or different from at least one polymer of 2-methacryloyloxyethyl phosphorylcholine in the lens body. The polymerizable composition or the polymerizable composition and the packaging solution can further comprise at least one form of polyvinyl pyrrolidone. In embodiments, the polyvinyl pyrrolidone in the polymerizable composition is associated with the lens body such that the polyvinyl pyrrolidone is released from the lens over at least eight hours, or at least about sixteen hours, based on in vitro release testing. The packaging solution can also comprise an aqueous solution containing a form of polyvinyl pyrrolidone. The polyvinyl pyrrolidone can be used alone or in combination with at least one polymer of MPC in the packaging solution. In certain embodiments, such as a contact lens containing PVP, the packaging solution may be a buffered saline solution that contains an additional amount of PVP, which may or may not have a different molecular weight than the PVP provided in the contact lens formulation. The contact lens package can comprise a container having a cavity for holding the contact lens and packaging solution. A seal can be provided surrounding the cavity in a conventional manner to maintain the contact lens in a sterile environment.

The present lenses are placed on a patient's eye such that the posterior surface of the lens contacts the corneal epithelium of the eye of the patient.

In embodiments of the present invention, a contact lens can be formed by polymerizing the at least one monomer present in the polymerizable composition to form a first polymer. As, in accordance with the present invention, a pre-formed hydrophilic polymer is also present in the polymerizable composition, an IPN can be created by polymerizing the at least one monomer to form a first polymer, where the first polymer is formed in the presence of a second polymer, the pre-formed hydrophilic polymer (e.g., one or more polymers of MPC). The IPN is not considered a copolymer of the first and second polymers. The water retention is not the same for a copolymer where the reactants are all polymerized together versus where a pre-formed polymer is present upon the polymerization of at least one monomer to form the first polymer component and thereby form the overall interpenetrating network. Further, the present invention does not form a modified polymer of MPC, but instead takes a hydrophilic polymer that is pre-formed, such as a polymer of MPC, and polymerizes at least one monomer in the presence of this pre-formed hydrophilic polymer such that the pre-formed hydrophilic polymer interpenetrates the first polymer once it is formed from the polymerization. The present invention is preferably not a simultaneous formation of an IPN which, again, is different from the interpenetrating polymer network preferably formed in the present invention.

For purposes of the present invention, an IPN material can be understood to be a material containing a mixture of two or more different polymers in which the polymers are entangled or entrapped in the material with little or no covalent bonds between the different polymers. Thus, an IPN is considered a different class of polymeric material having a different chemical structure and material morphology compared to chemically cross-linked materials where the polymers forming the cross-linked material, such as copolymers, including block copolymers and graft copolymers, are connected to each other through covalent bonds. An IPN material is chemically different than a chemically cross-linked polymeric material, such as a copolymer material, in which different polymers are covalently bonded to each other. As explained above, an IPN is a physical blend of two polymers, wherein one polymer physically interpenetrates, or is entrapped with, another polymer. Unlike IPNs, a chemically cross-linked material or copolymer material described above is not a physical blend of two polymers but, instead, the two polymers are covalently bonded together through chemical bonding. Thus, chemically speaking, the IPN would be chemically different from the cross-linked polymeric material since the two polymers forming the cross-linked polymeric material have been chemically altered through the formation of covalent bonds between the different polymers to ultimately create the cross-linked polymeric material, and since the IPN material does not include covalent bonds linking the different polymers. Contact lenses that are formed of an IPN material also have different properties compared to contact lenses that are formed of a chemically cross-linked material in which multiple polymers are covalently bonded to each other. For example, an IPN-based contact lens will typically have a lower modulus and be more flexible than a contact lens formed of a chemically cross-linked material described above. Since the chemically cross-linked material has a higher crosslink density compared to the IPN-based material (since the IPN-based material does not include covalent bonds between the different polymers), the chemically cross-linked material will be more rigid and will have a greater flexural modulus than an IPN-based material. Typically, contact lenses with a higher flexural modulus are perceived by contact lens wearers to be less comfortable than contact lenses with a lower flexural modulus. As described in more detail herein, polymers of MPC, including homopolymers and copolymers, are examples of one type of polymer that can be included in a chemical formulation with other reactive monomers and cross-linking agents that can be used to form an IPN material. In the production of a polymer of MPC-containing IPN, the polymer of MPC is basically inert or does not form covalent bonds with the other polymer component of the IPN. The polymer of MPC is basically inert or not chemically reactive because, in its native form, the polymer of MPC does not include any functional groups or is chemically unreactive (e.g., does not form covalent bonds). If the polymer of MPC is modified to include functional or reactive groups, then the polymer of MPC reacts with other monomers and the like in the formulation during polymerization processes.

Hydrogel contact lenses can be made by a variety of manufacturing techniques. A manufacturing process which employs a lathe to cut away portions of a polymerized cylindrical rod to form a lathed contact lens is referred to as lathing. A manufacturing process which employs two mold members, in which one of the mold members has a concave lens forming surface (e.g., front surface mold) and the other of the mold members has a convex lens forming surface (e.g., a back surface mold) are assembled together to form a mold assembly that includes a contact lens shaped cavity between the two mold members, is referred to as a cast molding process and results in a cast molded contact lens. Unlike a lathed contact lens, a cast molded contact lens is in the shape of a contact lens when it is removed from the mold. In contrast, in a lathing process, the polymerized product that is removed from the mold is a cylindrical rod that needs to be machined to produce a contact lens. While lathed contact lenses and cast molded contact lenses are produced by different processes, lathed contact lenses and cast molded contact lenses are also chemically and physically different from each other. For example, lathed contact lenses have been shown to have more rough lens surfaces, reduced water wettability, polarity, and critical surface tension, and different surface chemical content than cast molded contact lenses. Thus, although both lathed contact lenses and cast-molded contact lenses can be hydrogel contact lenses, the different types of contact lenses have different chemical and structural properties that distinguish them from each other. In the present invention, preferably, a cast-molded process to form cast-molded contact lenses is used.

A "lathable lens formulation" would not be expected to produce an acceptable cast molded contact lens if the lathable lens formulation was used in a cast molding system without changes to the formulation or manufacturing processes. The properties of the polymerized products are dependent on the types and amounts of chemical ingredients present in the polymerizable lens formulations. In a cast molding process, the polymerized product has a maximum thickness (the distance between the anterior surface of the lens and the posterior surface of the lens) on the order of hundreds of micrometers (for example, a spherical correction contact lens may have a maximum thickness of about 100 micrometers, and a toric contact lens with a prism ballast may have a maximum thickness of about 400 to 500 micrometers). In comparison, in a lathing process, the polymerized product has a maximum thickness substantially greater than a cast molded contact lens. For example, the polymerized product may have a thickness from about 1 centimeter to about 30 centimeters (about 1 foot). In a lathing process, the properties at different regions of the polymerized product are different. For example, an end of a polymerized rod may have had a greater oxygen exposure than a central region of the polymerized rod. These different properties affect the chemical and physical properties of the polymerized material, and the effects become more apparent with longer polymerized rods. Lathable lens formulations are made to address these differences, which are not as apparent, if at all, in a cast molded material due to the thin nature of the polymerized product, and to minimize the negative effects that the differences might have. In addition, in a cast molding system, the contact lens mold assembly has a cross-sectional distance, such as a diameter, that is substantially greater than the thickness of the contact lens (for example, a contact lens mold assembly may have a diameter of about 20 millimeters where the contact lens has a thickness of about 100 micrometers). Slight variations in the closure of the two mold members can cause substantial amounts of variability in the shape of the contact lens based on these relative differences (for example, if the mold closure is not symmetrical, the polymerized contact lens product can have undesired varying thicknesses or be associated with undesired prisming). The cast molding process, such as the mold filling steps (the step where the formulation is placed on the front surface mold), the mold closing steps, the curing steps, and the mold separation steps, will likely need to be adjusted to produce an acceptable cast molded contact lens. These considerations are not necessary when making a lathed contact lens. In addition, differences exist between curing profiles of lathable lens formulations and cast molded lens formulations. For example, certain lathable lens formulations cannot be used in a cast molding process because the formulation begins to polymerize or cure almost immediately upon placement in the cylindrical mold.

With the present invention, it is possible to have a controlled release or a sustained release of the hydrophilic polymer (e.g., one or more polymers of MPC or one or more polymers of MPC and a form of PVP) over a period of time. When the hydrophilic polymer comprises at least two polymers of MPC without a form of PVP, the release rate of the hydrophilic polymers will be slower (i.e., more sustained) than the release rate of a similar polymer comprising only one polymer of MPC. When the hydrophilic polymer comprises at least one polymer of MPC a form of PVP, the release rate of the hydrophilic polymers will be slower (i.e., more sustained) than the release rate of a similar polymer with the polymer of MPC but not the form of PVP. When the hydrophilic polymer comprises at least one polymer of MPC (alone or in combination with a form of PVP), and it has been equilibrated in a packaging solution comprising at least one polymer of MPC and/or at least one form of PVP, the release rate will be slower (i.e., more sustained) than the release rate of a similar polymer with the polymer of MPC that has not been equilibrated in a packaging solution comprising at least one polymer of MPC and/or at least one form of PVP.

The controlled release or sustained release of the hydrophilic polymers can be over a period of time such as 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, or more. The release can be constant (e.g., within +/−20% or +/−10%) over the period of time or can have a variable release rate, for instance where the wt % of release rate over time is front heavy or back heavy. For example, the release can be such where rate of polymer released is greater in the first several hours (e.g., in the first hour, second hour, third hour) or can be less. The release rate can be such that at least 5 wt % of the releaseable amount of polymer available (e.g. the amount of a polymer of MPC or a polymer of MPC and a form of PVP) occurs in the first 0 to 4 hours, or 0 to 8 hours. The at least 5 wt % can be from 5 wt % to 99 wt %, or 10 wt % to 95 wt %, or 15 wt % to 90 wt %, or 20 wt % to 85 wt % or 25 wt % to 80 wt %, or 30 wt % to 75 wt %, or 35 wt % to 70 wt %, or 40 wt % to 65 wt %, or 45 wt % to 65 wt % or 50 wt % to 65 wt % or 55 wt % to 75 wt %, or at least 10 wt %, at least 15 wt % or at least 20 wt % or at least 25 wt % or at least 40 wt % or at least 50 wt %. As an option, the release rate can be such that at least 5 wt % of the releaseable amount of polymer available (e.g. the amount of a polymer of MPC or a polymer of MPC and a form of PVP) occurs in the period of 4 to 8 hours, or 4 to 12 hours or 4 to 16 hours, or 5 to 12 hours, or 5 to 16 hours. In this embodiment, the at least 5 wt % can be from 5 wt % to 99 wt %, or 10 wt % to 95 wt %, or 15 wt % to 90 wt %, or 20 wt % to 85 wt % or 25 wt % to 80 wt %, or 30 wt % to 75 wt %, or 35 wt % to 70 wt %, or 40 wt % to 65 wt %, or 45 wt % to 65 wt % or 50 wt % to 65 wt % or 55 wt % to 75 wt %, or at least 10 wt %, at least 15 wt % or at least 20 wt % or at least 25 wt % or at least 40 wt % or at least 50 wt %. The time periods provided are a reference to when the polymer material (e.g., IPN) of the present invention is first subjected to an environment that permits the release of the hydrophilic polymer (e.g., a polymer of MPC or a polymer of MPC and a form of PVP), such as the eye, in lens solution, in a liquid environment, and the like.

As described herein, the present contact lenses exhibit improvements in surface friction, or wettability, or both. For example, the present contact lenses exhibit a reduced surface friction, a reduced contact angle, or both, compared to control contact lenses. In addition, embodiments of the present contact lenses have the reduced surface friction, reduced contact angle, or both, while maintaining a flexural modulus, water content, or both similar to contact lenses that do not include a second hydrophilic polymer component.

In certain embodiments, the present contact lenses that include a second hydrophilic polymer component have (i) a surface friction that is at least 30% less than an identical contact lens without the second hydrophilic polymer component (the control lens); (ii) a contact angle that is at least 10% less than the contact angle of the control lens; (iii) or both (i) and (ii), while having (iv) a flexural modulus that is within about 50% of the flexural modulus of the control lens; (v) an equilibrium water content that is within about 2% of the equilibrium water content of the control lens; or (vi) both (iv) and (v). In certain preferred embodiments of the present contact lenses, the contact lenses have features (iii) and (vi) above.

As one example, which is provided for purposes of illustration only, a control contact lens may have a normalized surface friction force of about 1, a contact angle of about 90 degrees, a flexural modulus of about 0.5 Mpa, and an equilibrium water content of about 60%. An embodiment of the present contact lenses described herein would accordingly have a normalized surface friction force of about 0.7 or less, a contact angle of about 81 degrees or less, a flexural modulus from about 0.2 to about 0.8 Mpa, and an equilibrium water content from about 58% to about 62%.

As another example, which is provided for purposes of illustration only, a control contact lens may have a normalized surface friction force of about 1, a contact angle of about 84 degrees, a flexural modulus of about 0.3 Mpa, and an equilibrium water content of about 60%. An embodiment of the present contact lenses described herein would accordingly have a normalized surface friction force of about 0.7 or less, a contact angle of about 76 degrees or less, a flexural modulus from about 0.1 to about 0.5 Mpa, and an equilibrium water content from about 58% to about 62%.

In additional embodiments, the surface friction of the present contact lenses is between about 30% and about 80% less than the control contact lens, for example, the surface friction of the present contact lenses may be about 35%, about 40%, about 45%, about 50%, about 55%, about 60%, about 65%, about 70%, about 75% less than the control contact lens.

In any of these embodiments, or all of the embodiments, the contact angle is between about 10% and 60% less than the contact angle of the control lens. In further embodiments, the contact angle is between about 20% and about 50% less than the contact angle of the control lens. In still further embodiments, the contact angle is between about 25% and about 45% less than the contact angle of the control lens.

In any of these embodiments, or all of the embodiments, the flexural modulus of the lens of the present invention differs from the flexural modulus of the control lens within a range of about 10% to about 60%. In further embodiments, the flexural modulus of the lens differs from the control lens within a range of about 20% to about 50%. In still further embodiments, the flexural modulus differs within a range of about 25% to about 45%.

In any of these embodiments, or all of the embodiments, the water content of the lens of the present invention differs from the water content of the control lens within a range of about 0% to about 20%. In further embodiments, the water content of the lens of the present invention differs from the water content of the control lens within a range of between about 0% and about 10%. In still further embodiments, the water content differs in a range of between about 0.5% and about 5%.

EXAMPLES

The following Examples illustrate certain aspects and advantages of the present invention, which should be understood not to be limited thereby. All parts, percentages and ratios are by weight unless indicated otherwise.

Example 1

Preparation of Contact Lenses

Polymerizable lens formulations were prepared by mixing monomers, a crosslinker that is reactive with the monomers, an initiator, and a tinting agent, with a substantially non-reactive hydrophilic polymer. Some of the polymerizable lens formulations contained 5% water.

Contact lens molds were injection molded from polypropylene resin using conventional injection molding techniques and equipment. Each contact lens mold included a female mold member that includes a concave optical quality surface for forming the front surface of the contact lens, and a male mold member that includes a convex optical quality surface for forming the back surface of the contact lens. The female mold member can be understood to be a front surface mold, and the male mold member can be understood to be a back surface mold.

An amount (60 µl) of the polymerizable lens formulation was placed on the concave surface of the female mold member. The male mold member was placed in contact with the female mold member such that the polymerizable lens formulation was located in a contact lens shaped cavity formed between the concave surface of the female mold member and the convex surface of the male mold member. The male mold member was held in position by an interference fit between a peripheral region of the female and male mold members.

The contact lens mold containing the polymerizable lens formulation was then placed in an oven where the polymerizable lens formulation was cured at a temperature of about 100° C. for about 30 minutes. After curing, the contact lens mold contained a polymerized contact lens product within the contact lens shaped cavity.

The contact lens mold was removed from the oven and allowed to cool to room temperature (about 20° C.). The contact lens mold was mechanically demolded to separate the male and female mold members from each other. The polymerized contact lens product remained attached to the male mold member.

The polymerized contact lens product was then mechanically delensed from the male mold member to separate the contact lens product from the male mold member.

The separated contact lens product was then placed in a borate buffered saline (BBS) solution in a contact lens blister package, which was then sealed with a foil covering, to form a packaged hydrated contact lens. The lenses in the blister were sterilized by autoclaving.

The measurements and testing described below were performed on these packaged contact lenses.

Example 2

Measurement of Friction Force on Contact Lens Surfaces

Atomic Force Microscopy (AFM) was used to measure the friction force on hydrated contact lenses. A Veeco Digital Instruments CP-II AFM was used to measure the friction force of the fully hydrated contact lens surface under PBS. Contact mode images were taken with silicon nitride V-shaped cantilevers with a 12 μm diameter borosilicate glass sphere tip and a spring constant of 0.03N/m. Normal force applied to the tip was 1.0 nN. Scan rate was 0.8 Hz and scan area was 30×30 μm. 3 areas per lens and 3 lenses per study were measured.

Example 3

Measurement of Contact Lens In Vitro Release Profiles

Release profile of the substantially unreactive hydrophilic polymer was measured by using the gel permeation chromatography (GPC) method. For each sample, 1 lens was blotted (with lens paper) to remove excess packaging solution, placed in a clean vial with 400 μl PBS (pH=7) and kept at 35° C. on a 300 rpm shaker for the desired releasing time interval. The extract was removed from the vial, placed in a GPC autosampler vial and then analyzed on a Waters GPC system (Waters 1525 Binary HPLC pump, Waters Corporation, Milford, Mass.) with refractive index detection. Triplicate samples were tested at each time point. Detailed GPC method parameters are as follows: Ultrahydrogel 250 (300×7.80 mm) with Ultrahydrogel gard column, mobile phase 20% MeOH/80% $H_2O$, flow rate 0.8 ml/min, injection volume 50 μl, Waters 2414 refractive index detector.

Example 4

Hydrogel Contact Lenses Containing LIP

Contact lenses were prepared as described in Example 1. Four batches (A (control), B-1, B-2, and B-3 in Table 1) of hydrogel contact lenses were prepared. The polymerizable lens formulations are shown in Table 1, where the amounts of each ingredient are in unit parts. In Table 1, the chemical abbreviations are defined as follows: MPC: 2-methacryloyloxyethyl phosphorylcholine (NOF Corporation, Tsukuba, Japan); HEMA: 2-hydroxyethyl methacrylate (Degussa Corp., Piscataway USA); EGDMA: ethylene glycol dimethacrylate (Esstech Inc., Essington, Pa., USA); Initiator: 2,2'-azobisisobutyronitrile (AIBN) (Sigma-Aldrich, St. Louis, Mo., USA); VB6: HEMA coated pigment of Vat Blue 6 (tinting agent) (Bioedge Research, La Jolla, Calif., USA); LIP: a copolymer of 2-methacryloyloxyethyl phosphorylcholine and n-butyl methacrylate, obtained as LIPIDURE-PMB®, in powder form, from NOF Corporation, Tsukuba, Japan. As indicated, LIP is represented by Formula I described herein where X is about 2000 and Y is about 500. MPC can also be obtained from companies such as Biocompatibles Limited (Great Britain), or can be produced, such as described in U.S. Pat. Nos. 5,981,786; 6,420,453; and 6,423,761.

Total parts of each formulation A and B-1 to B-3 is based on the combined parts of MPC, HEMA, EGDMA, Initiator, VB6 and LIP. For purposes of these examples, the unit amount can be converted to weight percentages by determining the sum of all of the unit parts in the table and dividing the respective unit part by the sum of all of the unit parts.

TABLE 1

| Formulation ID | Composition Ingredients (Unit Parts) | | | | | |
| --- | --- | --- | --- | --- | --- | --- |
| | MPC | HEMA | EGDMA | Initiator | VB6 | LIP |
| A (control) | 14.7 | 77.9 | 0.7 | 0.46 | 7.5 | 0 |
| B-1 | 14.29 | 81.89 | 0.7 | 0.46 | 1.68 | 1 |
| B-2 | 14.00 | 81.89 | 0.7 | 0.46 | 0.00 | 3 |
| B-3 | 14.7 | 77.9 | 0.7 | 0.46 | 7.5 | 5 |

Batches of contact lenses which were the reaction product of these four lens formulations were examined for a number of properties shown in Table 2. All of these measurements were performed using conventional methods and equipment. Table 2 demonstrates that contact lenses resulting from lens formulations containing 5 unit parts of LIP as LIPIDURE-PMB® (Formulation B-3), or less, exhibited substantially similar diameters, base curves, center thicknesses (CT), Transmittance (T), modulus, water content, and sessile drop contact angles to control lenses that contained no LIP as LIPIDURE-PMB®.

TABLE 2

| | | Properties | | | | | | | | |
| --- | --- | --- | --- | --- | --- | --- | --- | --- | --- | --- |
| Formulation ID | LIP amount (Unit Parts) | Diameter (mm) | Base Curve (mm) | CT (μm) | T (%) | Modulus (MPa) | Elongation (%) | Tensile Strength (MPa) | Water Content (%) | Contact Angle |
| A (control) | 0 | 13.84 | 8.49 | 84.0 | 97.1 | 0.379 | 111.6 | 0.274 | 60.0 | 97.4 |
| B-1 | 1 | 13.76 | 8.36 | 88.7 | 97.1 | 0.368 | 116.5 | 0.281 | 59.5 | 99.2 |
| B-2 | 3 | 13.90 | 8.30 | 83.2 | 96.7 | 0.342 | 263.3 | 0.648 | 60.9 | 100.7 |
| B-3 | 5 | 13.98 | 8.20 | 91.0 | 96.4 | 0.392 | 283.0 | 0.677 | 62.7 | 94.3 |

As shown in FIG. 1, the presence of LIP in the polymerizable lens formulations resulted in hydrogel contact lenses with reduced surface friction compared to controls. The reduction in surface friction was dose dependent in that the surface friction of the contact lenses decreased as the amount of LIP increased. The reduced surface friction is indicative of enhanced lubricity of the surfaces of the contact lenses.

Figure 2:
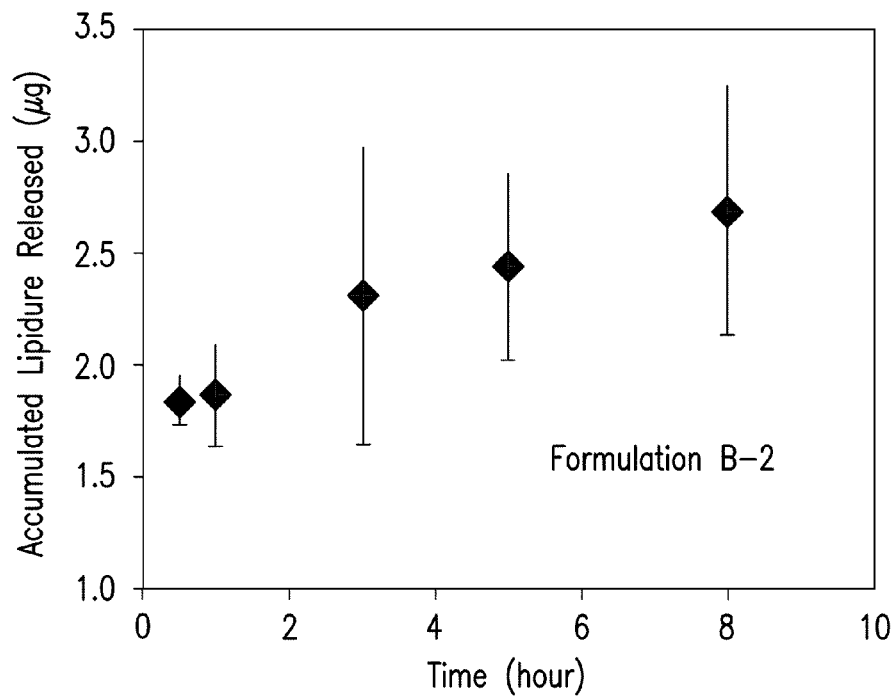
FIG. 2 is a graph illustrating the release profile of the substantially unreactive hydrophilic polymer from contact lenses prepared from formulation B-2.
Figure 3:
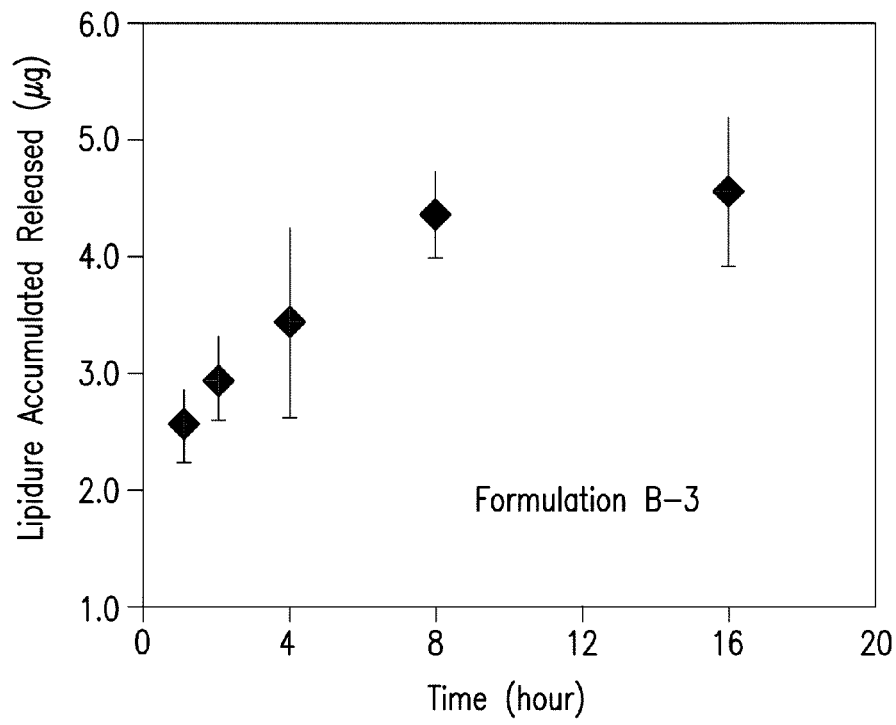
FIG. 3 is a graph illustrating the release profile of the substantially unreactive hydrophilic polymer from contact lenses prepared from formulation B-3.

In addition, as shown in FIG. 2 and FIG. 3, contact lenses containing LIP, which is believed to be physically entrapped in the polymer matrix of the contact lens, released LIP from the contact lens in a prolonged manner during in vitro release testing. In contact lenses obtained from formulations containing 3 parts LIP (FIG. 2), LIP was released for at least 8 hours from the contact lens into the surrounding liquid environment. In contact lenses obtained from formulations containing 5 parts LIP (FIG. 3), LIP was released for at least 8 hours from the contact lens into the surrounding liquid environment. The release appears to have plateaued between about 8 and about 16 hours.

Among other things, these data demonstrate that including a substantially non-reactive hydrophilic polymer in a polymerizable lens formulation can result in contact lenses with reduced surface friction and prolonged release of the substantially non-reactive hydrophilic polymer from the contact lens over the course of several hours.

Example 5

Hydrogel Contact Lenses Containing Polyvinyl Pyrrolidone

Contact lenses were prepared as described in Example 1. Five batches (C-1, C-2, C-3, C-4, and C-5 in Table 3) of hydrogel contact lenses were prepared. The polymerizable lens formulations are shown in Table 3, where the amounts of each ingredient are in unit parts. In Table 3, the chemical abbreviations are the same as Table 1, except for PVP which is the abbreviation for polyvinyl pyrrolidone. PVP (number average molecular weight of 360 kilodaltons) was obtained from Sigma-Aldrich USA and BASF, New Jersey USA. Total parts of each formulation C-1 to C-5 is based on the combined parts of PVP, MPC, HEMA, EGDMA, Initiator, VB6 and water.

TABLE 3

| Formulation ID | PVP (Parts) | MPC (Parts) | HEMA (Parts) | EGDMA (Parts) | Initiator (Parts) | VB6 (Parts) | Water (Parts) |
|---|---|---|---|---|---|---|---|
| C-1 | 1 | 14.7 | 77.9 | 0.7 | 0.46 | 7.5 | 5 |
| C-2 | 2 | | | | | | |
| C-3 | 3 | | | | | | |
| C-4 | 4 | | | | | | |
| C-5 | 5 | | | | | | |

Batches of contact lenses which were the reaction product of these five lens formulations were examined for a number of properties shown in Table 4. All of these measurements were performed using conventional methods and equipment. Table 4 demonstrates that contact lenses that result from lens formulations containing up to 5 unit parts of PVP (Formulation C-5), exhibited substantially similar diameters, base curves, center thicknesses (CT), transmittance (T), and water content (WC), to control lenses that contained no PVP (see Formulation A of Table 1).

TABLE 4

| Formulation ID | Sessile drop contact angle (deg.) | Diameter (mm) | BC (mm) | CT (μm) | T (%) | Modulus (MPa) | Elongation (%) | Tensile strength (MPa) | WC (%) |
|---|---|---|---|---|---|---|---|---|---|
| C-1 | 36.8 | 13.82 | 8.45 | 90 | 98.7 | 0.474 | 260.4 | 0.748 | 58.5 |
| C-2 | 32.7 | 13.76 | 8.38 | 91 | 98.5 | 0.469 | 230.5 | 0.579 | 58.7 |
| C-3 | 37.8 | 13.82 | 8.41 | 85 | 98.5 | 0.401 | 281.3 | 0.673 | 59.4 |
| C-4 | 33.7 | 13.81 | 8.43 | 86 | 98.7 | 0.432 | 214.2 | 0.535 | 59.5 |
| C-5 | 37.2 | 13.86 | 8.45 | 82 | 98.8 | 0.500 | 259.3 | 0.713 | 59.5 |

Figure 4:
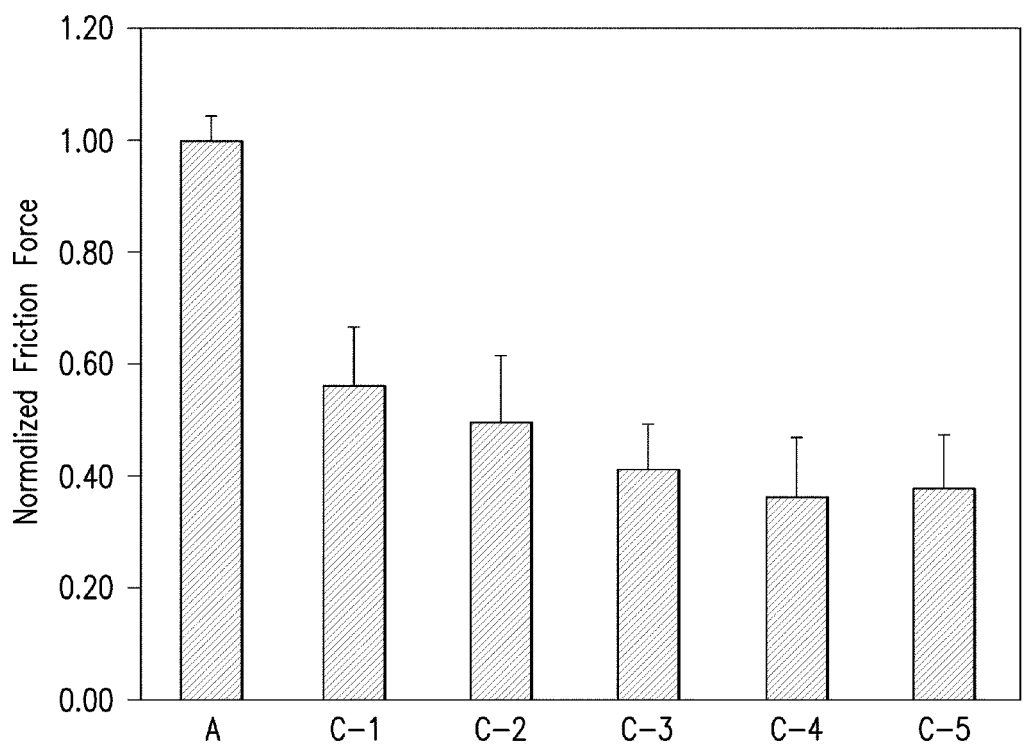
FIG. 4 is a graph illustrating a reduction in surface friction force of contact lenses that are the reaction product of polymerizable contact lens formulation containing monomers, a crosslinker reactive with the monomers, and another substantially unreactive hydrophilic polymer that is different than FIG. 1.

However, as shown in FIG. 4, the presence of PVP in the polymerizable lens formulations resulted in hydrogel contact lenses with reduced surface friction compared to controls. The reduction in surface friction was dose dependent in that the surface friction of the contact lenses decreased as the amount of PVP increased. This reduced surface friction is indicative of enhanced lubricity of the surfaces of the contact lenses.

Figure 5:
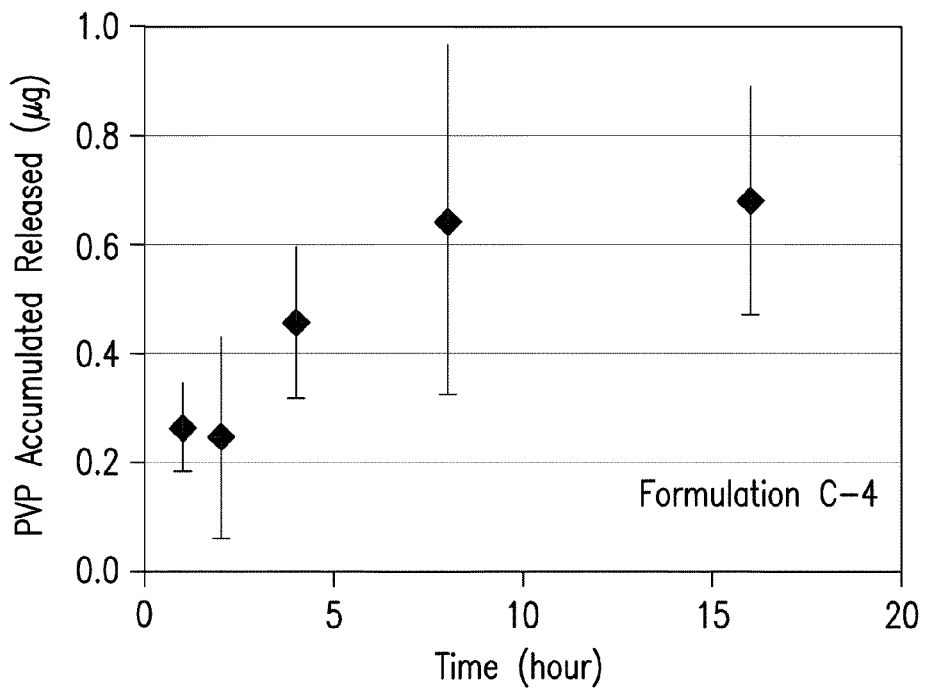
FIG. 5 is a graph illustrating the release profile of the substantially unreactive hydrophilic polymer from contact lenses prepared from formulation C-4

In addition, as shown in FIG. 5, contact lenses containing PVP, which is believed to be physically entrapped in the polymer matrix of the contact lens, released PVP from the contact lens in a prolonged manner during in vitro testing. In contact lenses obtained from formulations containing 4 parts PVP (FIG. 5), PVP was released for at least 8 hours from the contact lens into the surrounding liquid environment. The release appears to have plateaued between about 8 and about 16 hours.

Figure 6:
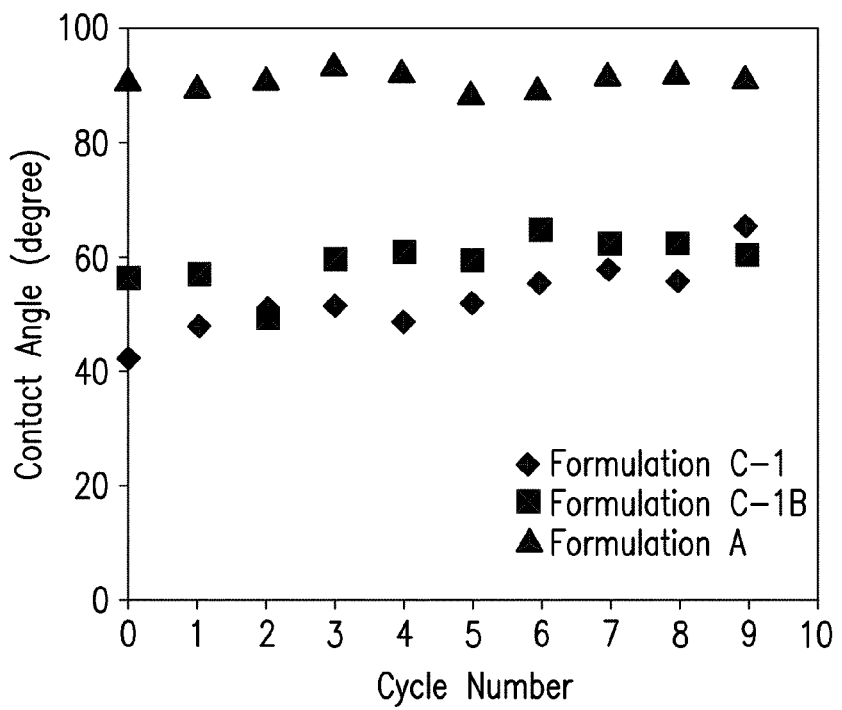
FIG. 6 is a graph illustrating the sessile drop contact angle of contact lenses prepared from formulation C-1 and a control contact lens prepared from formulation A, and a contact lens prepared from formulation C-1B.

In addition, as shown in FIG. 6, including PVP in the polymerizable lens formulation under the present manufacturing methods, resulted in a substantial reduction in sessile drop contact angle, as shown by Formulation C-1 in comparison to Formulation A. Furthermore, using a higher molecular weight PVP (Formulation C-1B; number average molecular weight of 440 kilodaltons) did not result in a significant change in sessile drop contact angle values compared to Formulation C-1).

Among other things, these data demonstrate that including a substantially non-reactive hydrophilic polymer in a polymerizable lens formulation can result in contact lenses with reduced surface friction and prolonged release of the substantially non-reactive hydrophilic polymer from the contact lens over the course of several hours.

Example 6

Hydrogel Contact Lenses Containing Lip and Polyvinyl Pyrrolidone

Contact lenses were prepared as described in Example 1 with the following alterations. Six batches (D-1 to D-6 in Table 5) of hydrogel contact lenses were prepared. The polymerizable lens formulations are shown in Table 5, where the amounts of each ingredient are in unit parts. The PVP was a mixture of 30% K-30 PVP and 70% K-90 PVP. The polymerization initiator used for these formulations was 0.5 parts VAZO® 64 (azo-bis-isobutyronitrile azonitrile, E.I. DuPont De Nemours & Co., Wilmington, Del., USA). Total parts used in each of formulations D-1 to D-6 is based on the combined parts of LIP, PVP (total), HEMA, PC-HEMA, EGDMA, Initiator, VB6 (pigment dispersed in HEMA) and water. VB6 was not added to formulations D-1 and D-2. As indicated in Table 5, Formulations D-4, D-5 and D-6 all had 0.05 parts LIP added, but varied the amount of PVP. As a control (E), Pro-Clear® lenses (CooperVision, Fairport, N.Y., USA) were used.

TABLE 5

| Formulation ID | LIP (Parts) | PVP (Parts) | HEMA (Parts) | PC-HEMA (Parts) | EGDMA (Parts) | Initiator (Parts) | VB6 (Parts) | Water (Parts) |
|---|---|---|---|---|---|---|---|---|
| D-1 | 3 | 1 | 84.7 | 14.6 | 0.7 | 0.5 | 0 | 0 |
| D-2 | 3 | 1 | 84.7 | 14.6 | 0.7 | 0.5 | 0 | 5 |
| D-3 | 0.5 | 1 | 77.2 | 14.6 | 0.7 | 0.5 | 7.5 | 5 |
| D-4 | 0.05 | 1 | 77.2 | 14.6 | 0.7 | 0.5 | 7.5 | 5 |
| D-5 | 0.05 | 2 | 77.2 | 14.6 | 0.7 | 0.5 | 7.5 | 5 |
| D-6 | 0.05 | 3 | 77.2 | 14.6 | 0.7 | 0.5 | 7.5 | 5 |

All polymerizable compositions were prepared as monomer mixtures by step-wise addition of each component with agitation at room temperature. Lenses were made manually by filling dry molds with 50 μL of monomer mix. They were subsequently closed and sealed manually. The 3 parts LIP lenses were thermally cured at 120° C. for 30 minutes while the remaining lenses were cured at 100° C. for 30 minutes. All lenses were de-molded and de-lensed manually, then packaged with 1.2 mL of BBS buffer solution, and autoclaved. The resulting lenses were measured for mechanical and optical properties, contact angle (sessile drop method), water content, and friction force. The instruments and/or standard tests used to determine these properties were the following: modulus and tensile strength: Instron 3342 (Instron Industrial Products, 825 University Ave, Norwood, Mass., USA); contact angle: DSA 100 (kruss Inc., 1020 Crews Road, Suite K, Matthews, N.C., USA), and friction force: AFM CP II (Veeco Instrument Inc., 112 Robin Hill Road, Santa Barbara, Calif., USA. The results in Table 6 for modulus, contact angle, tensile strength and water content are the average of results measured for five individual lenses. Table 7 shows the percentage change in modulus, contact angle, tensile strength and water content for formulations D-4, D-5, and D-6 as compared to the Control.

TABLE 6

| Formulation ID | PVP (Parts) | Modulus (MPa) | Contact Angle (°) | Tensile Strength (MPa) | Water Content (%) |
|---|---|---|---|---|---|
| E (Control) | 0 | 0.340 ± 0.03 | 83.5 ± 3.5 | 0.492 ± 0.07 | 60.5 ± 0.3 |
| D-4 (0.05 parts LIP) | 1 | 0.431 ± 0.13 | 78.4 ± 3.3 | 0.826 ± 0.07 | 58.4 ± 0.4 |
| D-5 (0.05 parts LIP) | 2 | 0.498 ± 0.17 | 71.3 ± 0.8 | 0.713 ± 0.07 | 58.4 ± 0.5 |
| D-6 (0.05 parts LIP) | 3 | 0.411 ± 0.15 | 56.5 ± 4.0 | 0.818 ± 0.06 | 58.2 ± 0.8 |

TABLE 7

| Formulation ID | PVP (Parts) | % Change in Modulus over Control | % Change in Contact Angle over Control | % Change in Tensile Strength over Control | % Change in Water Content over Control |
|---|---|---|---|---|---|
| D-4 (0.05 parts LIP) | 1 | +27 | −6 | +68 | −3 |
| D-5 (0.05 parts LIP) | 2 | +46 | −15 | +45 | −3 |

TABLE 7-continued

| Formulation ID | PVP (Parts) | % Change in Modulus over Control | % Change in Contact Angle over Control | % Change in Tensile Strength over Control | % Change in Water Content over Control |
|---|---|---|---|---|---|
| D-6 (0.05 parts LIP) | 3 | +21 | −32 | +66 | −4 |

Figure 7:
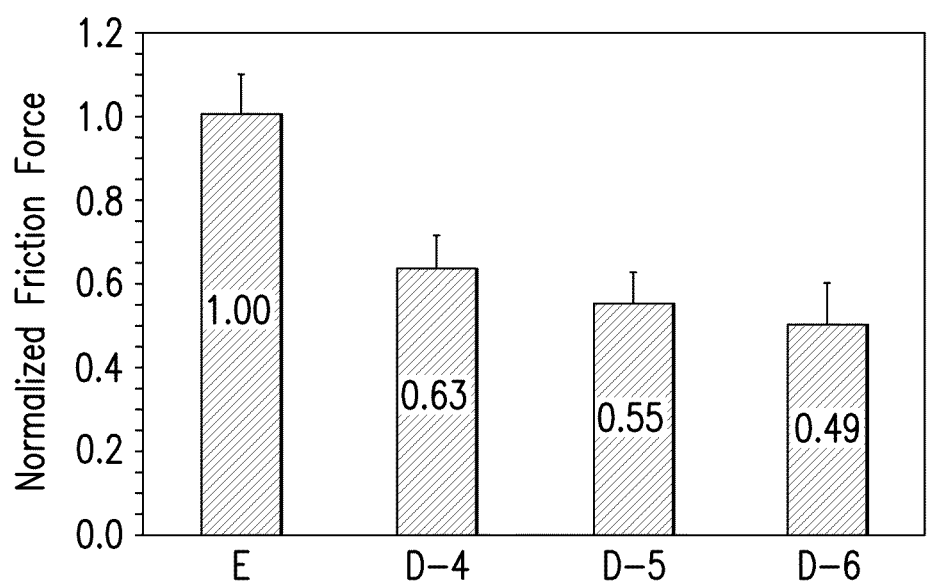
FIG. 7 is a graph illustrating the surface friction force of a control contact lense E and contact lenses prepared from formulations D-4, D-5 and D-6.

The friction force measured for the Control E (ProClear® lenses) and formulations D-4, D-5 and D-6 are shown in FIG. 7.

As shown by the results, the addition of the polymer of MPC (LIP) and a form of polyvinyl pyrrolidone (PVP) to the lens formulations resulted in a decreased contact angle, with the most significant reduction occurring with the formulation containing about 3 parts PVP. The addition of the polymer of MPC (LIP) and the form of PVP produced lens reduced surface friction. Formulations containing about 1 part PVP showed about a 40% reduction in friction force, formulations containing about 2 parts PVP showed about a 45% reduction in friction force, and formulations containing about 3 parts PVP showed about a 50% reduction in friction force.

Example 7

Hydrogel Contact Lenses Containing Lip and Polyvinyl Pyrrolidone

Contact lenses were made including a polymer of MPC (LIP) and PVP, and other components, with the following proportions. The PVP was a 30% K-30 and 70% K-90 formulation. The initiator used was VAZO® 64. Total parts used in of each of formulations F-1 to F-3 is based on the combined parts of LIP, PVP (total), HEMA, PC-HEMA, EGDMA, Initiator, VB6 and water.

TABLE 8

| Formulation ID | LIP (Parts) | PVP (Parts) | HEMA (Parts) | PC-HEMA (Parts) | EGDMA (Parts) | Initiator (Parts) | VB6 (Parts) | DI Water (Parts) |
|---|---|---|---|---|---|---|---|---|
| F-1 | 0.05 | 1 | 77.2 | 14.6 | 0.7 | 0.50 | 7.5 | 5 |
| F-2 | 0.05 | 2 | 77.2 | 14.6 | 0.7 | 0.50 | 7.5 | 5 |
| F-3 | 0.05 | 3 | 77.2 | 14.6 | 0.7 | 0.50 | 7.5 | 5 |

Figure 8:
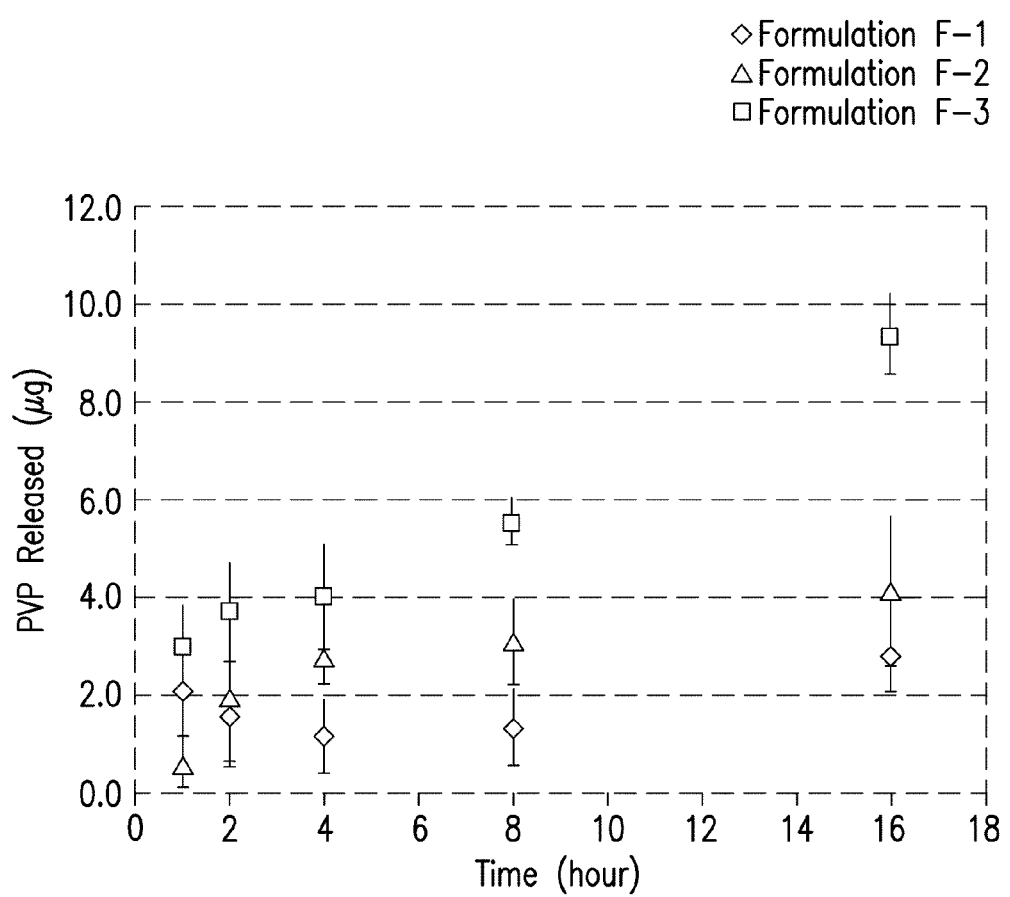
FIG. 8 is a graph illustrating the amount of PVP released (μg) over time from contact lenses prepared from formulations F-1, F-2 and F-3, as determined by in vitro release testing via GPC analysis.

Lenses were made manually by filling dry molds with 50 μl, of monomer mix. They were subsequently closed and sealed manually and then thermally cured at 100° C. for 30 minutes. All lenses were de-molded and de-lensed manually then packaged with 1.2 mL of BBS solution, and autoclaved. Once the lenses had fully hydrated and equilibrated, the resulting lenses were taken out of their packaging, excess packaging solution was dried off, and each lens was placed into a glass vial containing 0.4 mL of a phosphate buffered saline (PBS) solution. Each vial was placed into a shaker rotating at 300 rpm at 35° C. Time points were taken at 1, 2, 4, 8, and 16 hours unless indicated otherwise. The concentration of PVP present in the solution was determined via GPC analysis. Each time point represents an average of 3 individual lenses. The release profiles for lenses of formulations F-1, F-2 and F-3 are shown in FIG. 8.

The formulations containing a polymer of MPC (LIP) and a form of PVP produced lenses capable of releasing PVP over a period of at least 8 hours. The addition of about 3 parts of a mixture of two forms of PVP to the formulation produced lenses which released the greatest amount of PVP, with the PVP being released over a period of about 16 hours.

In reference to the disclosure herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A hydrogel contact lens, comprising:
a hydrogel lens body which is the reaction product of a polymerizable composition, the polymerizable composition comprising one or more monomers, at least one crosslinker that crosslinks the one or more monomers during polymerization, and at least one polymer of 2-methacryloyloxyethyl phosphorylcholine, wherein said one or more monomers and at least one crosslinker form a first polymer component and wherein said at least one polymer of 2-methacryloyloxyethyl phosphorylcholine is physically entangled with said first polymer component in the hydrogel lens body, wherein the at least one polymer of 2-methacryloyloxyethyl phosphorylcholine is present in the hydrogel lens body such that the at least one polymer of 2-methacryloyloxyethyl phosphorylcholine is released from the lens for at least eight hours based on in vitro testing, and the at least one polymer of 2-methacryloyloxyethyl phosphorylcholine is a copolymer of 2-methacryloyloxyethyl phosphorylcholine and n-butylmethacrylate.

2. The hydrogel contact lens of claim 1, wherein the at least one polymer of 2-methacryloyloxyethyl phosphorylcholine is a copolymer of 2-methacryloyloxyethyl phosphorylcholine and n-butylmethacrylate having the formula:

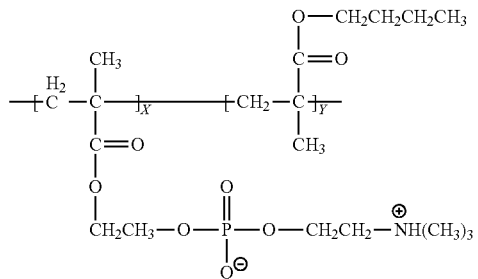

where X is about 1,600 to about 2,400 and Y is about 400 to about 600.

3. The hydrogel contact lens of claim 1, wherein the one or more monomers comprise 2-hydroxyethyl methacrylate (HEMA) and 2-methacryloyloxyethyl phosphorylcholine (MPC), the at least one crosslinker comprises an ethyleneglycol dimethacrylate crosslinker, and the polymerizable composition further comprises a thermal polymerization initiator.

4. The hydrogel contact lens of claim 1, wherein the polymerizable composition further comprises an agent selected from the group consisting of a tinting agent, an ultraviolet absorbing agent, a colorant, an antimicrobial agent, and combinations thereof.

5. The hydrogel contact lens of claim 1, wherein the polymerizable composition further comprises polyvinyl pyrrolidone.

6. The hydrogel contact lens of claim 5, wherein the polyvinyl pyrrolidone is a mixture of at least two forms of polyvinyl pyrrolidone having a different average molecular weight relative to one another.

7. The hydrogel contact lens of claim 5, wherein the polyvinyl pyrrolidone is associated with the hydrogel lens body such that the polyvinyl pyrrolidone is released from the lens for at least eight hours based on in vitro testing.

8. The hydrogel contact lens of claim 5, wherein the at least one polymer of 2-methacryloyloxyethyl phosphorylcholine and the polyvinyl pyrrolidone are present in the polymerizable composition in a total amount of from 0.005 wt % to 20 wt %.

9. The hydrogel contact lens of claim 1, having a surface friction of the lens body that is at least 35% less than a surface friction of a second hydrogel contact lens comprising the reaction product of an identical polymerizable composition without the at least one polymer of 2-methacryloyloxyethyl phosphorylcholine.

10. The hydrogel contact lens of claim 1, having a sessile drop contact angle of the hydrogel lens body that is at least 5% less than a sessile drop contact angle of a second hydrogel contact lens comprising the reaction product of an identical polymerizable composition without the at least one polymer of 2-methacryloyloxyethyl phosphorylcholine.

11. The hydrogel contact lens of claim 1, wherein the at least one polymer of 2-methacryloyloxyethyl phosphorylcholine is physically entrapped by a network of the first polymer component without being copolymerized thereto.

12. The hydrogel contact lens of claim 1, having a surface friction of the hydrogel lens body that is at least about 20% less than a surface friction of a second hydrogel contact lens comprising the reaction product of an identical polymerizable composition without the at least one polymer of 2-methacryloyloxyethyl phosphorylcholine.

* * * * *